United States Patent [19]

Kurihara et al.

[11] Patent Number: 4,693,142

[45] Date of Patent: Sep. 15, 1987

[54] AUTOMATIC TRANSMISSION SYSTEM FOR VEHICLES

[75] Inventors: Kazumasa Kurihara, Higashimatsuyama; Kenji Arai, Higashimasyuyama, both of Japan

[73] Assignee: Diesel Kiki Co., Ltd., Tokyo, Japan

[21] Appl. No.: 829,256

[22] Filed: Feb. 14, 1986

[30] Foreign Application Priority Data

Feb. 26, 1985 [JP]  Japan .................................. 60-35331

[51] Int. Cl.⁴ ............................................ B60K 41/06
[52] U.S. Cl. ...................................... 74/861; 74/866; 74/878
[58] Field of Search ................ 74/866, 865, 878, 877, 74/871, 861; 364/424.1

[56] References Cited

U.S. PATENT DOCUMENTS

| | | | |
|---|---|---|---|
| 4,073,203 | 2/1978 | Wurst et al. | 74/866 |
| 4,107,776 | 8/1978 | Beale | 74/866 |
| 4,350,058 | 9/1982 | Miller et al. | 74/866 |
| 4,414,863 | 11/1983 | Heino | 74/731 |
| 4,523,281 | 6/1985 | Noda et al. | 74/866 |
| 4,576,065 | 3/1986 | Speranza et al. | 74/866 |
| 4,584,906 | 4/1986 | Nagaoka et al. | 74/866 |

FOREIGN PATENT DOCUMENTS 5997351  11/1982  Japan .

Primary Examiner—Leslie Braun
Assistant Examiner—Martin G. Belisario
Attorney, Agent, or Firm—James C. Wray

[57] ABSTRACT

In a vehicle automatic transmission system employing a gear-type transmission, the system has a selector having a drive position for allowing automatic gear-change operation over a plurality of gear positions and a gear-holding position provided adjacent to the drive position, and the gear-change operation is limited below a gear position or is fixed at the gear position which is decided the actual gear position at the time a operation lever of the selector is moved from the drive position and the gear-holding position, whereby the system enables gear holding in each of the gear position by only providing the selector one with additional position.

9 Claims, 3 Drawing Figures

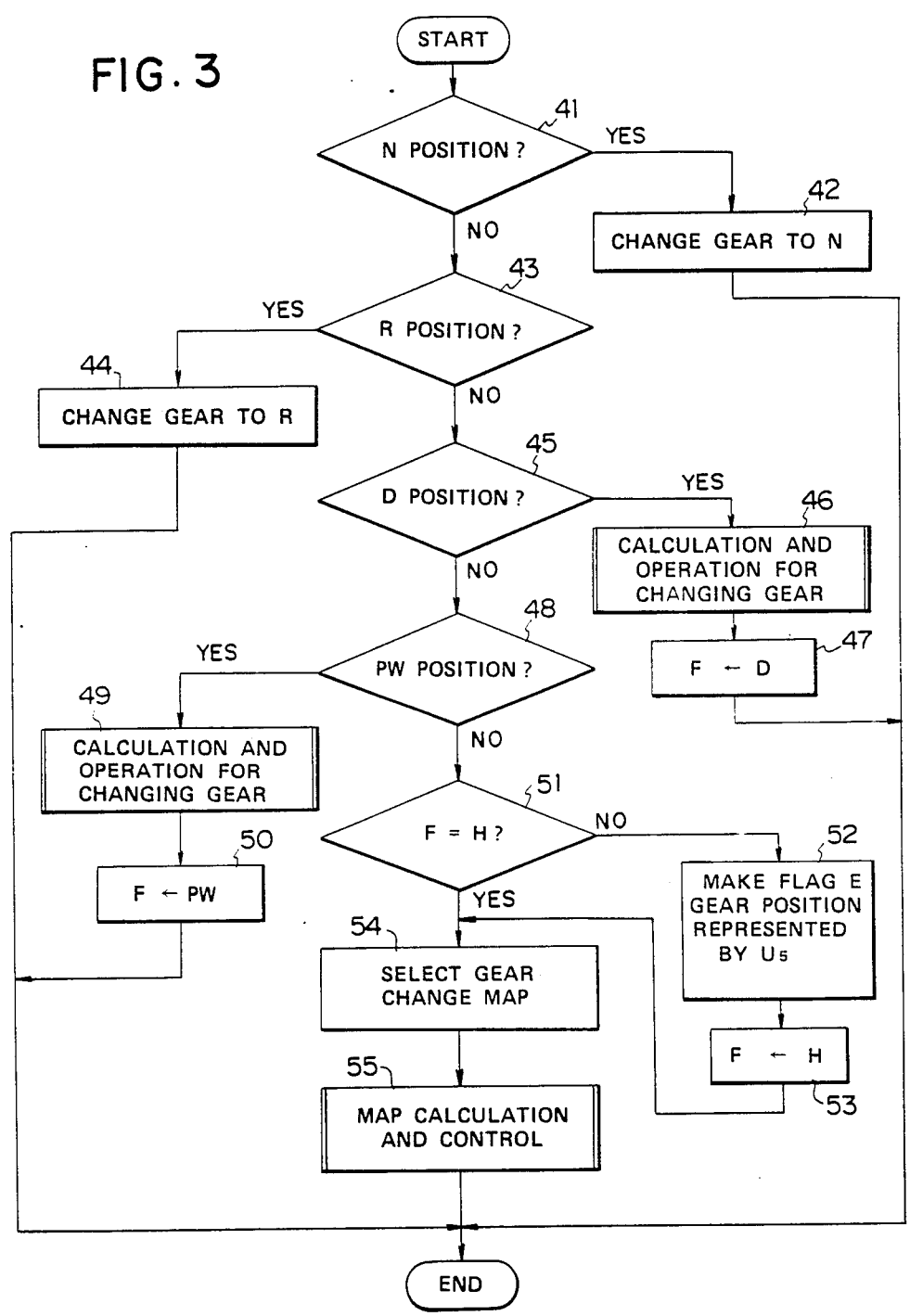

4,693,142

AUTOMATIC TRANSMISSION SYSTEM FOR VEHICLES

BACKGROUND OF THE INVENTION

This invention relates to an automatic transmission system for vehicles which is capable of easily selecting a suitable gear change map out of a plurality of gear change maps.

There have been proposed various automatic transmission systems for vehicles which are adapted to detect the amount of depression of an accelerator pedal and the speed of the vehicle and compute an optimum gear position for each instant based on a predetermined gear change map, thereby to control the gear position of a gear-type transmission according to the result of the computation. In the automatic transmission systems of this type, as the optimum gear position is determined by the amount of depression of the accelerator pedal and the speed of the vehicle, if, for example, the accelerator pedal is released on an upward slope to negotiate a curve or the like, the transmission will be shifted up and if the accelerator pedal is again depressed after the curve, the transmission will be shifted down. This is sensed as poor vehicle response by the driver.

In order to eliminate this disadvantage, there has been proposed another type of automatic transmission system for vehicles which is provided with, for example, a first-gear position and/or a second-gear position in addition to a drive-gear position (D-position) and which automatically carries out gear-change operations over all of the gears according to the amount of depression of the accelerator pedal and the speed of the vehicle so that the transmission may be held in the first-gear position or may effect gear-change within the first-gear position and the second-gear position.

However, in the automatic transmission system having multi-gear positions, if a gear-holding position is provided for every gear, the number of shifting positions of the selector will be increased and the operational ease which is a key feature of the ordinary linear-type selector will be spoiled. On the other hand, if an H-type shifting lever of the type employed with conventional manual transmissions is used instead of the linear type selector, the switch mechanism for detecting the position of the shifting lever will be made complicated and the safety device for preventing the shifting lever from being erroneously moved from the D-range position to the reverse-gear position (R-position) will also be made complicated.

Further, Japanese Patent Publication Disclosure No. 59-97351 discloses, an automatic transmission system wherein a basic gear change map can be synthesized with additional gear change maps selectable according to the driver's taste or the use of the vehicle so as to obtain a desired gear change map.

Although this automatic transmission system enables gear changing to be effected according to an optimum gear change map suited to the driver's taste or the use of the vehicle, it is disadvantageous in that it requires a mode selecting switch, a memory switch, etc. in addition to the selector lever. This makes the operation complicated and increases the driver's work.

SUMMARY OF THE INVENTION

It is therefore an object of the present invention to provide an improved automatic transmission system for vehicles which is capable of holding any gear position without degrading the ease of operation.

It is another object of the present invention to provide an automatic transmission system for vehicles which is simple in structure and excellent in operational ease and which enables gear holding in each of the gear positions by only providing the selector one with additional position.

It is a further object of the present invention to provide an automatic transmission system for vehicles which is capable of changing gears among a plurality of gear positions whose maximum gear position is determined by the simple operation of a selector.

In accordance with the present invention, there is provided an automatic transmission system including a gear-change mechanism connected to an internal combustion engine and adapted to operate in response to an electric signal, means for outputting a condition signal indicative of a driving condition of the internal combustion engine at each instant, and a control means responsive to the condition signal for controlling the operation of the gear-change mechanism on the basis of a desired gear change map; which system comprises a first detection means for detecting the gear position of the gear-change mechanism at each instant; a selector having at least a drive position for allowing automatic gear change over a plurality of gear positions of the gear-change mechanism and a gear-holding position provided adjacent to the drive position and adapted to output a command signal indicating the position at which an operation lever of the selector is set; a storage means for storing a plurality of sets of map data corresponding to a plurality of gear change maps; a second detection means responsive to the output from the first detection means and the command signal for detecting the gear position of the gear-change mechanism when the operation lever is switched from the drive position to the gear-holding position; and, means responsive to the command signal and the output from the second detection means for controlling the gear-changing operation based on a set of map data corresponding to the command signal stored in the storage means when the operation lever is in a position other than the gear-holding position and based on a set of map data corresponding to the output of the second detection means stored in the storage means when the operation lever is in the gear-holding position.

When a position other than the gear-holding position is selected by the selector, the map data in the storage means which corresponds to the position selected by the selector is selected by the control means. The control means carries out gear change control on the basis of the selected data. On the other hand, when the selector is switched from the drive position to the gear-holding position, the gear position of the gear-change mechanism assumed at the time of switching is detected by the second detection means and the map data corresponding to the result of the detection is used for the gear change control.

By preliminarily storing predetermined map data in the storage means, when the drive position is selected and the vehicle is running at the optimum gear position based on the map data selected for the drive position, if the operation lever of the selector is switched from the drive position to the gear-holding position, the gear position can remain in that one gear position.

In this case, the map data selected at the time the operation lever is switched from the drive position to the gear-holding position may be map data in which the maximum gear position is limited to that indicated by the result of the detection by the second detection means.

Thus, only by providing one additional position of the selector, each of the gear positions of the multi-gear position type transmission can have its own gear change map. Therefore, complication of the operation can be prevented and the function can be improved remarkably without detracting from the ease of operation.

BRIEF DESCRIPTION OF THE DRAWINGS

FIG. 3 is a flowchart of a control program executed by a microprocessor of the system illustrated in FIG. 2.

DESCRIPTION OF THE PREFERRED EMBODIMENTS

Figure 1:
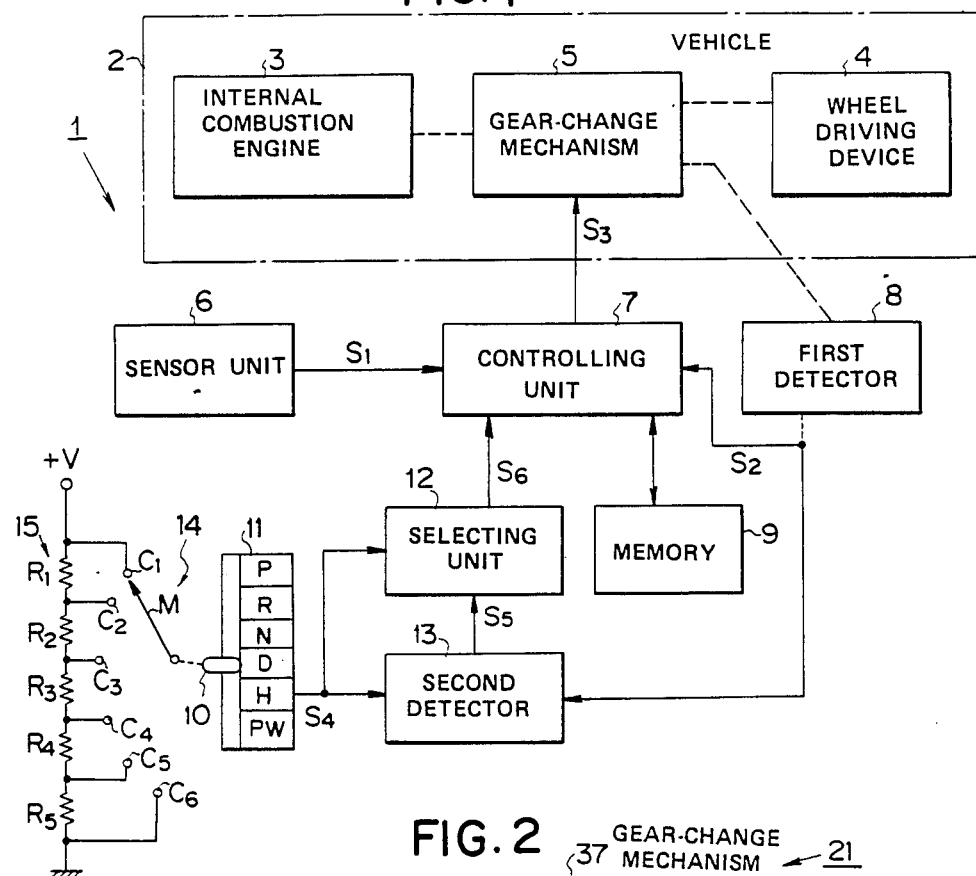
FIG. 1 is a block diagram showing an embodiment of the present invention.

FIG. 1 shows a block diagram showing an embodiment of an automatic transmission system for vehicles according to the present invention. This automatic transmission system 1 automatically carries out gear-change operation of a gear-change mechanism 5 provided between an internal combustion engine 3 which powers a vehicle 2 and a wheel driving device 4. The gear-change mechanism 5 includes a gear-type transmission (not shown) and is responsive to an electric signal supplied from the outside to change its gear position. The automatic transmission system 1 includes a sensor unit 6 for detecting a driving condition of a vehicle 2 at each instant. The sensor unit 6 outputs a signal $S_1$ indicative of the driving condition of the vehicle 2 and the signal $S_1$ is input to a controlling unit 7. The gear-change mechanism 5 is connected to a first detector 8 for detecting the actual gear position of the gear-change mechanism 5 at each instant and a position signal $S_2$ output from the first detector 8, which is indicative of the actual gear positions of the gear-change mechanism 5, is input to the controlling unit 7.

A memory 9 stores a plurality of sets of map data corresponding to a plurality of gear change maps provided in advance. A desired set of map data among the plurality of sets of stored map data is selected by the controlling unit 7 as will be described in detail later. In the controlling unit 7, the optimum gear position at each instant is computed, referring to the selected data and based on the signal $S_1$. The controlling unit 7 further refers to the position signal $S_2$ to output a control signal $S_3$ to the gear-change mechanism 5 so as to obtain a gear position according to the computation result. The gear change control of the gear-change mechanism 5 is carried out in response to the control signal $S_3$.

In order to instruct which map data among the plurality of sets of map data stored in the memory 9 is to be used, the automatic transmission system 1 includes a selector 11 having an operation lever 10. The selector 11 has a parking position P, a reverse gear position R, a neutral gear position N, a drive gear position D for allowing automatic gear-changing operation over all gear positions, a gear position H allowing gear changing to lower than a certain gear position, and a gear position PW for allowing driving of the vehicle with high power, which are all arranged linearly as illustrated. This selector 11 outputs a command signal $S_4$ indicative of the gear corresponding to the position of the operation lever 10. The command signal $S_4$ is input to a selecting unit 12 and a second detector 13.

The selector 11 comprises, for example, a switch 14 comprised of six fixed contacts $C_1$ to $C_6$ corresponding to the respective positions and a movable contact M connected to the operation lever 10 so as to be connected to one of the fixed contacts corresponding to the position selected by the operation lever 10 and a voltage divider circuit 15 wherein resistors $R_1$ to $R_5$ are connected in series and adapted to divide a DC voltage $+V$. One output voltage of six output voltages from the voltage divider circuit 15 is selected by the switch 14 and this voltage is output as the command signal $S_4$ corresponding to the position of the operation lever 10.

The second detector 13 is input with the position signal $S_2$ as well as the command signal $S_4$ and it detects the gear position of the gear-change mechanism 5 at the time when the operation lever 10 is switched from the position D to the adjacent position H or is switched from the position PW to the position H. The result of the detection is input to the selecting unit 12 as a detection signal $S_5$.

The selecting unit 12 is responsive to the command signal $S_4$ and the detection signal $S_5$. When the operation lever 10 is moved to a position other than the position H, the map data predetermined for the selected position is selected in the controlling unit 7 in accordance with a selection signal $S_6$, in response to the command signal $S_4$, for use in the controlling unit 7. On the other hand, when the operation lever 10 is located at the position H, the selecting unit 12 outputs the selection signal $S_6$ for controlling the controlling unit 7 so that the map data corresponding to the gear position represented by the detection signal $S_5$ is selected from the map data stored in the memory 9 in the controlling unit 7 for use in the controlling unit 7. In response to the selection signal $S_6$ the controlling unit 7 reads out the required map data from the memory 9 according to the selection signal $S_6$ as described above and uses the same for attaining the necessary gear change control.

The map data selected by the selecting unit 12 based on the detection signal $S_5$ is such that the gear position represented by the detection signal $S_5$ is determined as the highest gear position within the gear-change positions. Therefore, for example, when the position D or PW is selected by the selector 11 and the vehicle 2 is running in third gear and if the operation lever 10 is moved to the position H, the detection signal $S_5$ carries an indication of third gear. Therefore, map data corresponding to a gear change map determined in advance so as to carry out the shift-up only to third gear is selected from the map data stored in the memory 9 and it is used for the control computation executed at the controlling unit 7. As a result, the gear-changing operation thereafter is carried out only up to third gear.

When the position PW is selected in the selector 11, gear change maps for high power which enable higher output to be obtained are used instead of the gear change maps used for the position D. The selection of the map data indicative of the gear change map for high power is also carried out according to the command signal $S_4$ and the selected data is supplied for the map computation in the controlling unit 7. In this case, for example, when the operation lever 10 is moved from the position PW to the position H at the time the vehicle 2 is running in third gear, map data corresponding to a gear change map determined in advance so as to carry out the shift-up only to third gear is selected and it is used for the control computation executed at the controlling unit 7. As a result, the gear-change operation thereafter is carried out only up to third gear.

As can be understood from the above, since the gear map is selected according to the gear position assumed when the operation lever 10 is moved from the position D or PW to the position H, it is unnecessary to greatly increase the number of the positions of the selector 11 and there is no need to additionally employ operating members such as switches, except in the selector 11. For this reason, the kinds of maps to be used may be increased greatly without deteriorating with the ease of operation and any desired control can be attained.

Figure 2:
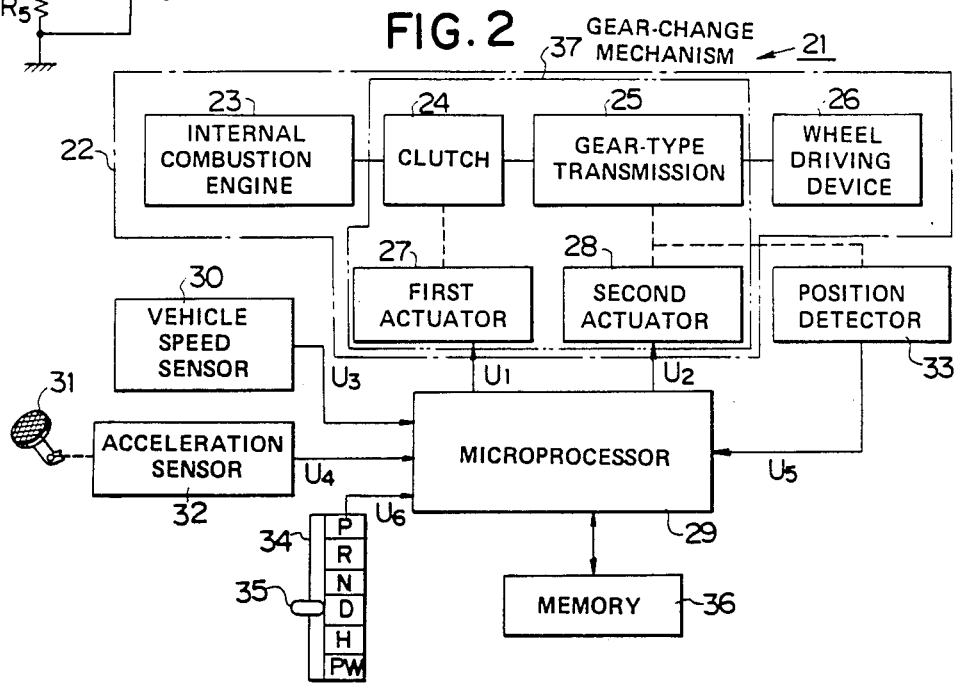
FIG. 2 is a block diagram showing another embodiment of the present invention.

FIG. 2 illustrates, in the form of a block diagram, another embodiment of the present invention wherein an automatic transmission system for vehicles uses a microprocessor. In a vehicle 22 powered by an internal combustion engine 23, 21 is an automatic transmission device, 24 is a friction clutch, 25 is a gear-type transmission and 26 is a wheel driving device. The rotational power output from the internal combustion engine 23 is transmitted to the wheel driving device 26 through the clutch 24 and the gear-type transmission 25. The clutch 24 and the gear-type transmission 25 are connected to a first actuator 27 and a second actuator 28, respectively. The first and second actuators 27 and 28 are driven by a first control signal $U_1$ and a second control signal $U_2$ from a microprocessor 29, respectively, so as to carry out an engagement or disengagement operation of the clutch 24 and a gear shift operation in response to the first and second control signals $U_1$ and $U_2$, respectively. Thus, a desired gear position can be obtained. As apparent from the foregoing description, the clutch 24, the gear type transmission 25 and the first and the second actuators 27 and 28 constitute a gear-change mechanism 37 equivalent to the gear-change mechanism 5 of FIG. 1.

In order to detect a driving condition of the vehicle 22 at each instant, a vehicle speed sensor 30 for detecting the speed of the vehicle 22 and an acceleration sensor 32 for detecting the amount of depression of an accelerator pedal 31 are provided. The vehicle speed sensor 30 outputs a vehicle speed signal $U_3$ indicative of the speed of the vehicle at each instant and the acceleration sensor 32 outputs an acceleration signal $U_4$ indicative of the amount of depression of the accelerator pedal 31 at each instant. The vehicle speed signal $U_3$ and the acceleration signal $U_4$ are input to a microprocessor 29.

Numeral 33 designates a position detector for detecting a gear position of the gear-type transmission 25 at each instant. The position detector 33 outputs a position signal $U_5$ indicative of the gear position to the microprocessor 29. Numeral 34 designates a selector similar to the selector shown in FIG. 1. The selector 34 outputs a command signal $U_6$ indicative of the position of an operation lever 35 and the command signal $U_6$ is input to the microprocessor 29.

Since the structure of the selector 34 is similar to that of the selector 11, parts and portions corresponding to the switch 14 and the voltage divider circuit 15 of the selector shown in FIG. 1 are omitted in FIG. 2.

A memory 36 connected to the microprocessor 29 stores map data similar to the map data stored in the memory 9 of FIG. 1 and a control program for carrying out control substantially the same as in the system shown in FIG. 1. When the control program is executed at the microprocessor 29, a gear change control computation according to the required map data selected in response to the respective signals $U_3$ to $U_6$ is carried out in response to the signals $U_3$ to $U_6$, respectively. According to the gear change control computation result, the first and second control signals $U_1$ and $U_2$ are output from the microprocessor 29.

FIG. 3 illustrates a flowchart showing the control program stored in the memory 36. Upon starting of the program, a determination as to whether the operation lever 35 of the selector 34 is in the position N or not is made, at step 41, based on the command signal $U_6$. If the decision in step 41 is YES, the gear position of the gear-type transmission 25 is shifted to the neutral position N (step 42).

If the determination at step 41 is NO, a determination as to whether the operation lever 35 is moved to the position R or not is then carried out (step 43) and if the determination in step 43 is YES, the gear position of the gear-type transmission 25 is shifted to the reverse position R (step 44).

If the determination in step 43 is NO, the program proceeds to step 45 where a decision as to whether the operation lever 35 is in the position D or not. If the determination in step 45 is YES, a first gear-change map provided in advance for the position D is selected for effecting fuel-efficient operation and gear-change computation on the basis of the first gear-change map is carried out and gear change control based on the computation result is carried out by the first control signal $U_1$ and the second control signal $U_2$ (step 46). Then, the content of the selector flag F is rendered D (step 47) to complete the gear change control.

If the determination in step 45 is NO, the program proceeds to step 48 to make a determination as to whether the operation lever 35 is in the position PW or not. If the determination in step 48 is YES, a second gear change map for obtaining high power output which has been provided in advance for the position PW is selected so as to carry out a gear change position computation based on the second gear-change map, and the gear change control according to the computation result is carried out by the first control signal $U_1$ and the second control signal $U_2$ (step 49). Then, the content of the selector flag F is made PW (step 50) and the execution of the program is completed.

If the determination in step 48 is NO, the program proceeds to step 51, where a determination is made as to whether the content of the selector flag F is H or not. Immediately after the operation lever 35 has been moved from the position PW or position D to the position H, the result of the decision in step 51 remains NO. Therefore, when the decision of step 51 is NO, the program proceeds to step 52 to make the content of the gear-change flag E the gear position at the time represented by the position signal $U_5$ and the content of the selector flag is made H (step 53). Thereafter, step 54 is executed.

At step 54, the selection of map data is carried out according to the content of the gear change flag E. The map calculation is carried out for the gear change according to the input signals $U_3$ and $U_4$, based on the map data selected at step 54 and the gear change control according to the calculation result is carried out by the first and second control signals $U_1$ and $U_2$. Therefore, in the following execution of the program, if the content of the selector flag F is H, the determination of step 51 becomes YES and only steps 54 and 55 will be executed. Therefore, change of the gear-change maps is not carried out.

The change of the gear change maps at the position H is carried out only when the operation lever 35 is moved from the position D or position PW to the position H.

With the arrangement as described above, when the position D is selected and, for example, the fourth gear position, in which the vehicle is running, is desired to be held on an upward slope, it suffices to move the operation lever 35 into the position H. By this operation, the maximum gear position is kept at the fourth gear position, so that even if the accelerator pedal is released or the speed of the vehicle increases, the gear-type transmission 25 is kept in the fourth gear position. Further, even after parking, the gear-type transmission 25 effects automatic gear change between the first and fourth gear positions. Therefore, unnecessary gear change operation which is not suited for the running condition as effected in the position D will be prevented and the driving feeling is very much improved.

In this connection, it is to be noted that the present invention can be applied to vehicles with any type of internal combustion engine and that the number of the gear positions of the transmission is not limited to that of the embodiments as illustrated and any number of gear positions may be employed.

In the embodiments described above, when the operation lever is moved from the position D or PW to the position H at the time the vehicle is running in Nth gear, the gear-change operation thereafter is carried out only up to Nth gear. However, in this case, the system may be constructed in such a way that the gear-change operation thereafter is carried out at only Nth gear position.

In the present invention, since gear change maps may be provided for the respective gear positions of the transmission and one of the gear change maps is selected according to the gear position when the operation number is moved to a desired holding range provided in the selector, it is not necessary to make the structure of the selector complicated. For this reason, the operation is simple and yet the function can be enhanced remarkably without deteriorating the ease of operation.

We claim:

1. An automatic transmission system for vehicles powered by an internal combustion engine, comprising:
    a gear-change mechanism connected to an internal combustion engine and adapted to operate in response to an electric signal;
    means for outputting at least one condition signal indicative of an operating condition of the internal combustion engine at each instant;
    a first detection means for detecting a gear position of said gear-change mechanism at each instant;
    a selector having at least a drive position for allowing automatic gear-change operation over a plurality of gear positions of said gear-change mechanism and a gear-holding position provided adjacent to the drive position;
    an output means responsive to the operation of an operation lever of said selector for outputting a command signal indicating a position at which the operation lever for selecting a desired operation mode is set;
    a storage means for storing a plurality of sets of map data corresponding to a plurality of gear change maps;
    a second detection means responsive to an output from said first detection means and the command signal for detecting the gear position of the gear-change mechanism at the time the operation lever is moved from the drive position to the gear-holding position;
    a map selecting means responsive to the command signal and an output from said second detection means for selecting a predetermined set of map data corresponding to the command signal sorted in said storage means when the operation lever is in a position other than the gear-holding position and a set of map data corresponding to the output of said second detection means stored in said storage means when the operation lever is in the gear-holding position, said set of map data corresponding to the output of said second detection means being a gear change map data in which the maximum gear position is limited to that indicated by the result of the detection at that time by said second detection means; and
    a control means responsive to the condition signal for controlling the operation of said gear-change mechanism in accordance with the set of map data selected by said map selecting means.

2. A system as claimed in claim 1 wherein said selector has a plurality of linearly arranged positions which correspond to predetermined operation modes and can be selected by the operation lever.

3. A system as claimed in claim 1 wherein said selector has a switch having a plurality of contacts corresponding to a plurality of operation modes selected by the operation lever and a voltage dividing circuit for providing different levels of voltage to the contacts of said switch, whereby a signal with a level corresponding to the selected operation mode is produced as the command signal in response to the operation of the operation lever for selecting the operation mode.

4. A system as claimed in claim 1 wherein the condition signals are at least a signal indicative of the amount of depression of an accelerator pedal and a signal indicative of the speed of the vehicle and an optimum gear position is decided on the basis of the gear change map in response to the amount of depression of the accelerator pedal and the speed of the vehicle.

5. A system as claimed in claim 1 wherein the gear position is fixed to that indicated by the result of the detection by said second detection means when the operation lever is moved from the drive position to the gear-hold position.

6. A system as claimed in claim 1 wherein the drive position is an all-gear position for allowing automatic gear-change operation over all gear positions of said gear-change mechanism.

7. A system as claimed in claim 1 wherein the drive position is for allowing automatic gear-changing operation over a plurality of gear positions with fuel-efficient operation.

8. A system as claimed in claim 7 wherein said selector further comprises a high power position for allowing automatic gear-changing operation over a plurality of gear positions with high power and the high power position is provided adjacent to the gear-holding position.

9. A system as claimed in claim 8 wherein said second detection means also detects the gear position when the operation lever is moved from the high power position to the gear-holding position.

* * * * *